United States Patent
Papania

(10) Patent No.: US 10,029,563 B2
(45) Date of Patent: Jul. 24, 2018

(54) ONE-WAY OR SELECTABLE CLUTCH WITH MULTIPLE ROWS OF RATCHET ELEMENTS

(71) Applicant: BORGWARNER, INC., Auburn Hills, MI (US)

(72) Inventor: James R. Papania, Bolingbrook, IL (US)

(73) Assignee: BorgWarner Inc., Auburn Hills, MI (US)

( * ) Notice: Subject to any disclaimer, the term of this patent is extended or adjusted under 35 U.S.C. 154(b) by 293 days.

(21) Appl. No.: 14/667,813

(22) Filed: Mar. 25, 2015

(65) Prior Publication Data

US 2015/0323020 A1   Nov. 12, 2015

Related U.S. Application Data

(63) Continuation-in-part of application No. 13/124,684, filed as application No. PCT/US2009/060863 on Oct. 15, 2009.

(Continued)

(51) Int. Cl.
*F16D 41/12* (2006.01)
*B60K 17/344* (2006.01)
*F16D 41/16* (2006.01)

(52) U.S. Cl.
CPC .......... *B60K 17/344* (2013.01); *F16D 41/125* (2013.01); *F16D 41/16* (2013.01); *Y10T 74/19102* (2015.01)

(58) Field of Classification Search
None
See application file for complete search history.

(56) References Cited

U.S. PATENT DOCUMENTS

| 5,738,604 A | 4/1998 | Dick |
| 6,588,559 B2 * | 7/2003 | Blair ................ B60K 23/06 |
| | | 180/249 |

(Continued)

FOREIGN PATENT DOCUMENTS

| CN | 101240821 A | 8/2008 |
| CN | 101285509 A | 10/2008 |
| WO | WO-03/067110 A2 | 8/2003 |

OTHER PUBLICATIONS

International Search Report and Written Opinion for related international application No. PCT/US2009/060863; report dated May 27, 2010.

(Continued)

*Primary Examiner* — Terence Boes
(74) *Attorney, Agent, or Firm* — Miller, Matthias & Hull LLP

(57) ABSTRACT

A one-way or selectable clutch with multiple circumferential rows of ratchet elements is disclosed. The clutch may include two or more rows of ratchet elements extending between two or more races. The device may be either a one-way clutch or a selectable mechanical clutch, and afford the benefits of reduced backlash and multiple modes of operation. Those modes may include free-wheel/overrun in both clockwise and counterclockwise directions, locked/transmit torque in both directions, locked in clockwise and overrun in counterclockwise directions, and locked in counterclockwise and overrun in clockwise directions.

19 Claims, 6 Drawing Sheets

Related U.S. Application Data

(60) Provisional application No. 61/107,571, filed on Oct. 22, 2008.

(56) References Cited

U.S. PATENT DOCUMENTS

| | | |
|---|---|---|
| 6,739,440 B1 | 5/2004 | Dick |
| 6,814,201 B2 * | 11/2004 | Thomas ............... F16D 41/185 192/43.1 |
| 7,500,548 B2 | 3/2009 | Kimes et al. |
| 2002/0157890 A1 | 10/2002 | Williams |
| 2003/0051959 A1 | 3/2003 | Blair |
| 2007/0278061 A1 | 12/2007 | Wittkopp et al. |
| 2008/0217131 A1 | 9/2008 | Wittkopp et al. |

OTHER PUBLICATIONS

International Preliminary Report on Patentability for related international application No. PCT/US2009/060863; report dated Apr. 26, 2011.

Office Action for related Chinese Application No. 200980139771.6; action dated Aug. 22, 2016.

\* cited by examiner

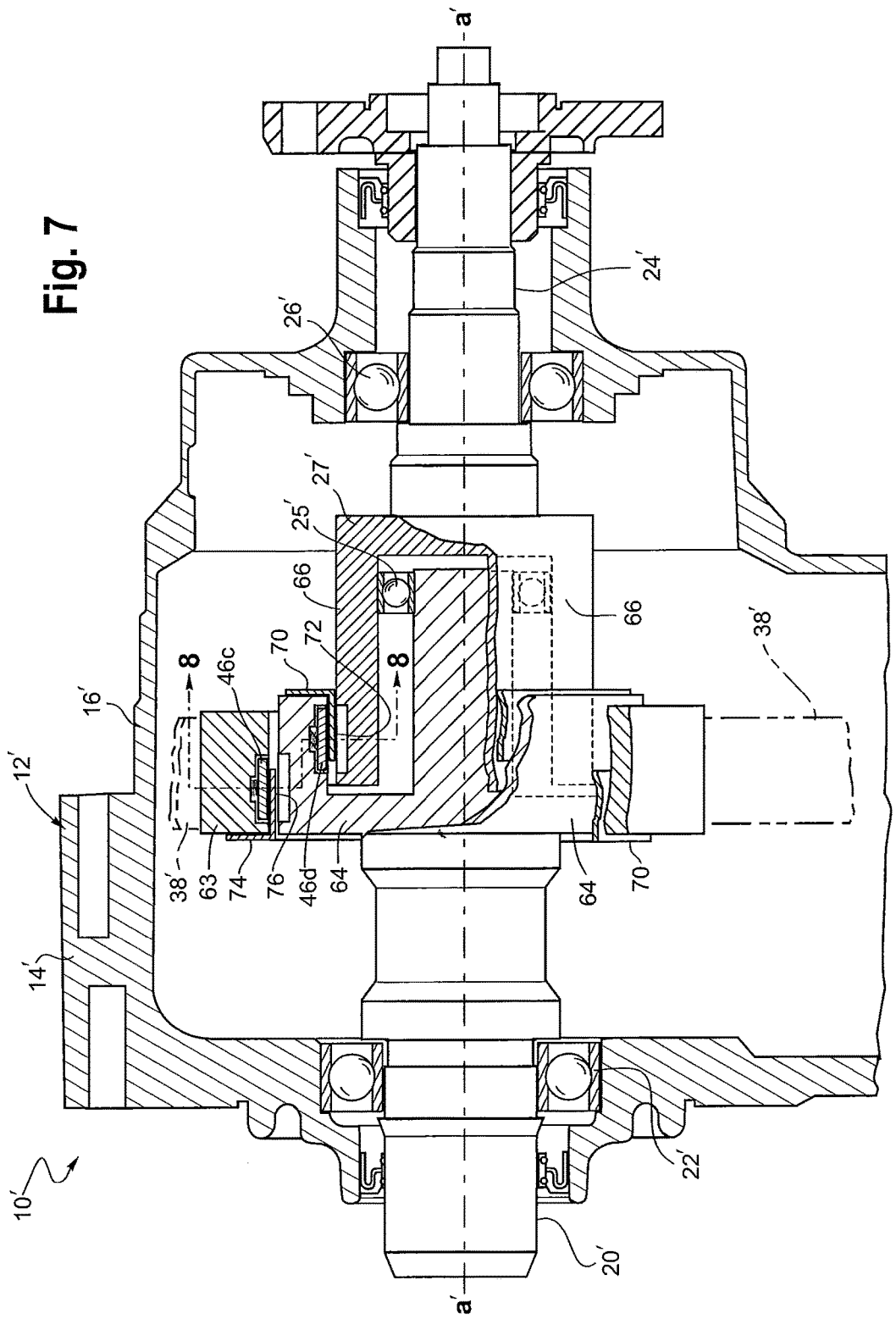

ONE-WAY OR SELECTABLE CLUTCH WITH MULTIPLE ROWS OF RATCHET ELEMENTS

RELATED APPLICATION

This application is a continuation-in-part of U.S. Ser. No. 13/124,684, filed on Apr. 18, 2011.

FIELD OF THE DISCLOSURE

The present disclosure generally relates to clutch assemblies and, more particularly, relates to radial ratchet one-way and selectably-engageable clutches.

BACKGROUND OF THE DISCLOSURE

Transfer cases are often used in both full and part-time four-wheel drive vehicles to distribute driving power received through an input shaft from the vehicle transmission to a pair of output drive shafts. One of the drive shafts powers the vehicle front wheels and the other drive shaft powers the vehicle rear wheels. In vehicles permitting shifting between two wheel drive and four wheel drive modes, the input shaft of the transfer case provides continuous power to one of its output shafts and selectively provides drive power to the other output shaft by some type of disengageable or otherwise adjustable coupling, such as a viscous coupling, electro-magnetic clutch, or positionable spur gearing. Other drive modes are sometimes provided, including four-wheel drive high for higher four-wheel drive speeds, four-wheel drive low for lower driving speeds, neutral for disengaging the transmission from the front rear axles to allow towing, and locked four-wheel drive for controlling wheel slippage.

Additionally, other transfer case applications have evolved, such as on demand four-wheel drive, in which a transfer case, with its related parts that provide four-wheel drive, is installed in the vehicle, yet four-wheel drive mode is only engaged, by automatic means, when there is a loss of two-wheel drive traction. Full time or constant, four-wheel drive mode, sometimes referred to as "all-wheel drive" is also currently available in some automotive variants. In this mode, four-wheel drive is often not deselectable, and thus remains a fixed configuration.

In the transfer cases used for these vehicles, certain elements, or components, are required to transmit the driving force. More particularly, certain elements are required to selectively transmit the driving force during particular driving situations but not in others. One example of a device used to selectively transmit driving or rotational force, in a transfer case, is a one-way clutch. One-way clutches are known devices having inner and outer races with an engagement mechanism disposed therebetween. Generally speaking, the engagement mechanism is designed to lock the races together when the relative rotation of the races is in one particular rotational direction. When the races rotate in the opposite relative direction, the engagement mechanism is unlocked and the races have free rotation relative to each other. In application, when the races are fixed to concentric shafts, the one-way clutch will function to hold the shafts together when engaged, causing them to rotate in the same direction and thereby transferring motive force, or drive torque, from one shaft to the other. When the one-way clutch is disengaged, the shafts can then free-wheel relative to each other.

Specific applications govern how the one-way clutch engagement is designed. A one-way clutch may be designed to have one race as the driving member and one as the driven member, or the clutch may be designed to allow either shaft to act as the driving member during different operating modes. In this manner, the locking mechanism of the one-way clutch may be designed to engage in response to the rotation of only one of the races, or the clutch may be designed so as to engage if and/or as either race provides the proper relative rotation.

The one-way clutch is typically used in circumstances in which shaft to shaft, or shaft to race, rotational, torque-transferring engagements are desirable, but a "hard" connection such as a spline or keyed connection would not work. For example, during certain operating parameters, a four-wheel drive vehicle experiences driveline difficulties that arise from having the front and rear wheels cooperatively driven, which can be alleviated by the use of one-way clutch devices within the transfer case. When a four-wheel drive vehicle turns a tight corner with four wheels coupled together on a paved road, the vehicle may experience what is known as "tight corner braking effect". This happens due to the inherent physical geometry that affects objects rotating at different radial distances from a center point. Two distinct effects generally occur with four-wheel drive vehicles. First, when any vehicle enters a curve the wheels on the outside of the curve must traverse a greater circumferential distance than the wheels inside of the curve due their greater radial distance from the center of the curve. The tighter the curve, the greater difference in the rate of rotational, angular speed between the inner wheels and the outer wheels. Therefore, in a curve the outside wheels must rotate faster than the inner wheels. This effect is exaggerated in a four-wheel drive vehicle but is generally countered by the differential assemblies of the vehicle installed at the front and rear axles. Secondly, since the front wheels are also leading the vehicle through the curve, they must rotate faster than the rear wheels. With a solid four-wheel drive engagement there is no device (such as a differential) to counter this action, and the slower moving rear-wheels act in an undesirable braking manner.

To resolve this problem, one-way clutches have been employed in the transfer case so as the vehicle begins turning a corner, the front wheels (connected to transfer case output shaft through a one-way clutch) are allowed to disengage and free-wheel faster than the rear-wheels. Specifically, the driven shaft of the one-way clutch (i.e. the output shaft to the four-wheel drive front wheels) begins turning faster than the input or driving shaft, and the locking mechanism of the one-way clutch disengages to allow free-wheeling of the output shaft relative to the input shaft. This momentarily takes the transfer case out of four-wheel drive mode, thus preventing the "tight corner braking effect".

Another undesirable four-wheel drive driving effect occurs during engine braking in a manual transmission of a four-wheel drive vehicle when in four-wheel drive and coasting. The manual transmission maintains a physical connection to the vehicle engine, such that when the vehicle is allowed to coast, the engine places a decelerating or braking force on the transfer case, both input and output shafts, and ultimately on both front and rear wheels. The normal and undesirable parasitic affect of engine braking through the rear wheels of a manual transmission two-wheel drive vehicle has a negative impact on fuel consumption and efficiency, which is exacerbated in four-wheel drive vehicles by virtue of addition of the front wheels. Thus, when a one-way clutch is used in a drive line of the transfer case, the slowing of the input shaft through the engine braking effect allows the output shaft (connected to the front wheels) to disengage and freewheel, momentarily taking the transfer case out of four-wheel drive and preventing the engine braking effect from passing through the front wheels, reducing the negative impact on fuel efficiency.

Finally, in an on-demand application, a one-way clutch can be employed in the transfer case so that in a normal two-wheel drive mode, if one of the rear wheels should slip during vehicle acceleration, the rotating speed of the input shaft will increase, so that the one-way clutch engaging elements will bring the transfer case into four-wheel drive and the front wheels into a driven mode.

While proving to be of great value, as transfer case design technology utilizing one-way clutches has continued to evolve, one-way clutch designs have revealed certain limitations. Most importantly, while a one-way clutch could solve the above-motioned problems and disadvantages, the one-way clutch could only work in one direction, if used alone. In other words, the one-way rotational forward engagement between the input and output shafts in the transfer case could allow forward four-wheel drive movement, but not reverse four-wheel drive movement. To provide this functionality, additional mechanisms and devices are added to the transfer case to supplement the limited functionality of one-way clutches. However, this has added both weight and complexity penalties to transfer case designs.

Concurrent ongoing design goals of reducing the mechanical complexity and physical bulk of transfer cases while increasing their functionally has brought about the design of another torque transmitting device using the one-way clutch mechanism to allow engagement in a bi-rotational, or two-way, manner. This device is typically called a two-way clutch. A two-way clutch may solve all the above four-wheel drive difficulties while providing full forward and reverse functionality. It may allow the input shaft to be designed as a driving member for four-wheel drive modes, in both rotational directions while offering bi-directional free-wheel movement of the driven output shaft as needed when the input shaft is stationary or rotating slower than the output shaft.

Yet, even though conventional two-way clutch designs have been useful in solving these and other four-wheel drive issues, it has become apparent in applications that use a two-way clutch for a four-wheel drive engagement that certain deficiencies still exist. Specifically, there exists a physical angular distance from the engaged inner connection between the races of the two-way clutch for the first rotational direction to the engagement of the races in the reverse, or second direction. This angular distance also known as backlash, can cause mechanical problems as the two-way clutch is repeatedly called on to change its driving rotational direction over the service life of the transfer case. This is due to the mechanical load brought to bear in the switch from one rotational direct to the other. This rotational shift takes a form of a high-impact shock loading that is not only absorbed by the two-way clutch, but is also translated to the other components attached to a two-way clutch in the drive line, all to a repetitive detrimental effect. The shock loading is detrimental as it reduces component life and reliability, while adding unpleasant ride characteristics to the vehicle.

Some attempts have been made to reduce amount of backlash within two-way clutch assemblies. These attempts have generally required substantial, or radical, redesigns of transfer case structure. In the typical two-way clutch, the structurally inherent backlash can only be physically reduced to between about four and five degrees of rotation. Even this seemingly small amount of backlash causes the noted issues.

Therefore, there exists a need for improved clutch assemblies for use in transfer cases having reduced or minimal backlash, which can thereby reduce impact loading, extend clutch life, and improve riding characteristics of vehicles.

SUMMARY OF THE DISCLOSURE

In accordance with one aspect of the disclosure, a clutch is disclosed which comprises an inner race, an outer race, and a plurality of ratchet elements extending between the inner and outer races, the plurality of ratchet elements being disposed in axially spaced multiple rows between the inner and outer races.

In accordance with another aspect of the disclosure, a method of operating a clutch with reduced backlash and bi-directional capacity is disclosed which comprises providing a clutch assembly including of an inner race, an outer race, a locking arm, a cam surface, and a shoulder, rotating the inner race clockwise relative to the outer race, such rotation causing the locking arm to slide along the cam surface thereby allowing inner race to move freely, and rotating the inner race counterclockwise relative to the outer race, such rotation causing the locking arm to engage the shoulder and preventing further rotation.

In accordance with another aspect of the disclosure, a motor vehicle transfer case is disclosed which comprises a housing formed by a case and a cover, the case being operatively coupled to an output of a transmission; an input shaft rotatably supported by an input roller bearing and the case; a primary output shaft rotatably supported by a rear output roller bearing in the cover; a secondary output shaft rotatably supported at the lower portion of the housing by a front output roller bearing, the secondary output shaft having a bell-shaped flange operatively coupled to a bulge joint to transmit torque; a drive sprocket splined to the primary output shaft and operatively coupled to a lower driven sprocket the lower driven sprocket being rotatably supported by a rear roller bearing to selectively transmit torque to the secondary output shaft; and a clutch assembly comprising of an inner race, an outer race and a plurality of ratchet elements extending between the inner and outer races, the plurality of ratchet elements being disposed in axially spaced multiple rows between the inner and outer races.

In accordance with yet another aspect of the disclosure, a further embodiment of a motor vehicle transfer case is disclosed which comprises three races, with two rows of radially spaced ratchets between the respective races, and wherein the ratchets are effective to provide four-mode functionality.

These and other aspects and features of the disclosure will become more apparent upon reading the following detailed description in view of the accompanying drawings.

BRIEF DESCRIPTION OF THE DRAWINGS

FIG. 7 is a cross-sectional view of an embodiment of a modified transfer case of FIG. 1;

DETAILED DESCRIPTION OF THE DISCLOSURE

Figure 1:
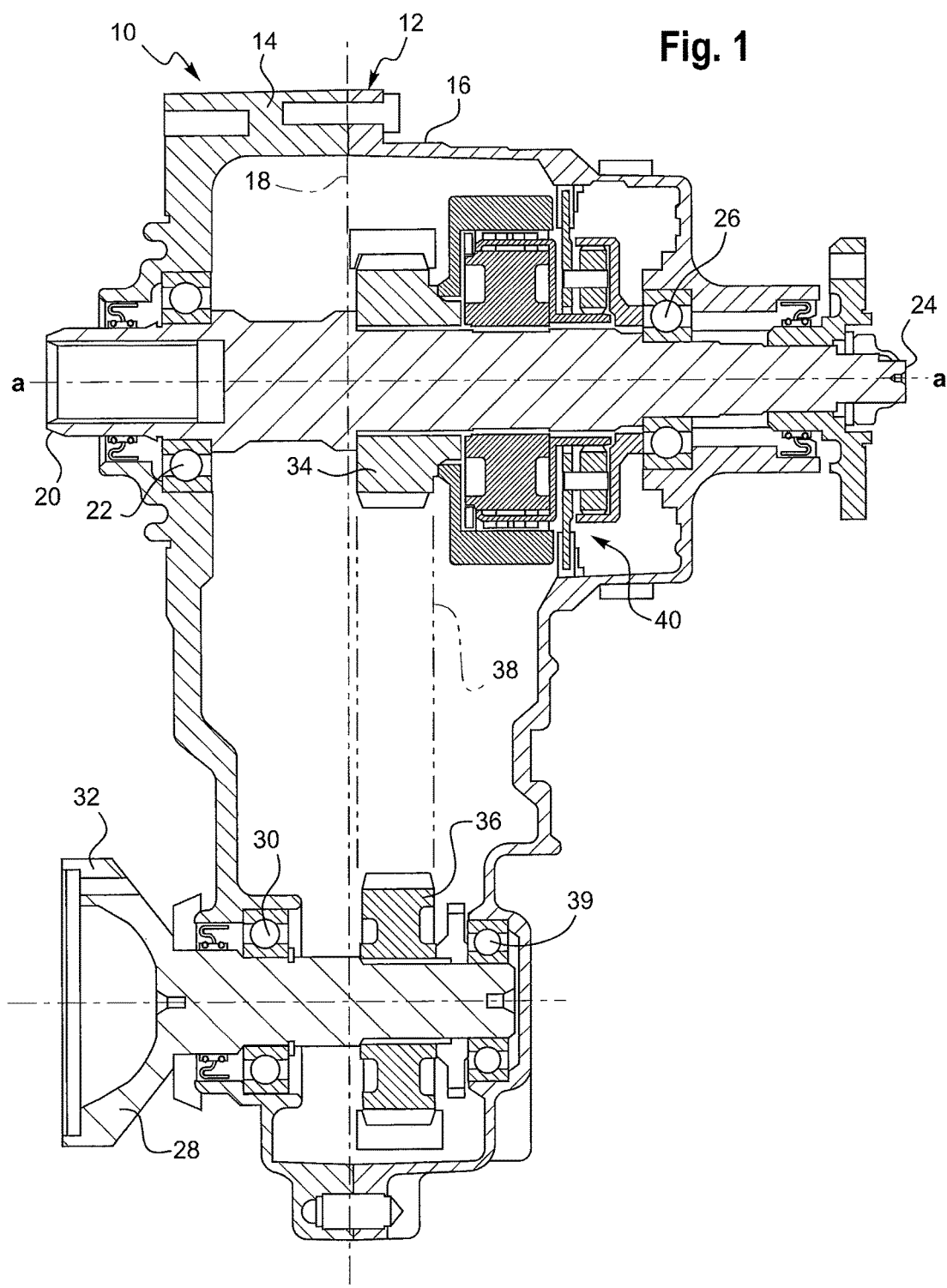
FIG. 1 is a cross-sectional view of a transfer case employing a clutch manufactured in conjunction with the teachings of the disclosure.

Referring now to the drawings and with specific reference to FIG. 1, a transfer case utilized in a four-wheel drive vehicle (not shown) and incorporating the present disclosure is generally referred to by reference numeral 10. The transfer case 10 includes a housing 12 which is formed by a case 14 and a cover 16 which mate along central line 18 in a conventional matter.

An input shaft 19, having an input end 20 and an output end 24 is rotatably supported by an input roller bearing 22 and the case is operatively coupled to an output of a transmission in a conventional matter. Similarly, primary output shaft 24 is rotatably supported by a rear output roller bearing 26 in the cover 16 in the conventional matter.

As will be noted in the drawings, the input and output shafts are integral, but those of ordinary skill in the art will appreciate that they may be in formed as two shafts splined together in a conventional matter. Together the input and output shafts define the main shaft of the transfer case.

In addition, the transfer case 10 of the present disclosure includes a secondary output shaft 28 rotatably supported at the lower portion of the housing 12 by a front output roller bearing 30. The secondary output shaft 28 has a bell-shape flange 32 which is operatively coupled to a bulge joint (not shown) to transmit torque to the front wheels (not shown) of the vehicle when it is in a four-wheel drive mode.

A drive sprocket 34 is splined to the primary output shaft 24 and rotates therewith in the upper portion of housing 12. The drive sprocket 34 is operatively coupled to a lower driven sprocket 36 by a chain 38 shown in phantom. The lower driven sprocket 36 is rotatably supported in the lower portion of the housing 12 by rear roller bearing 39 to selectively transmit torque to the secondary output shaft 28. The one speed transfer case 10 described after this point is conventional in the art.

However, with reference to the clutch of the present disclosure it is generally referenced to by reference numeral 40. As shown best in FIG. 2, in a first embodiment, the clutch 40 can include an inner race 42, and outer race 44, and a plurality of ratchet elements 46 extended between the inner and outer races 42 and 44. The ratchet elements 46 may be provided in a first circumferential row 46a, and an axially spaced second circumferential row 46b.

As will be understood by one of ordinary skill in the art, the ratchet elements 46 may include a pivot axle 50 from which extends a locking arm 52. The outer race 44 may be machined to have a plurality of mounting recesses 54 into which each ratchet element 46 could be pivotably mounted. In other embodiments, the plurality of ratchet elements 46 may be similarly mounted for pivotal motion in the inner race 42.

Figure 3:
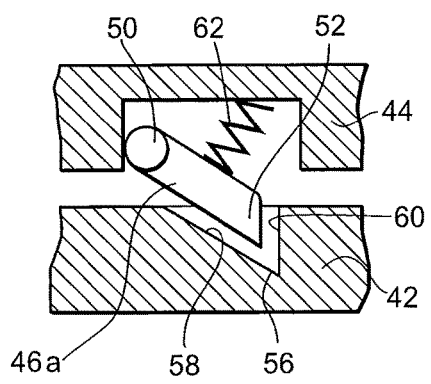
FIG. 3 is a cross-sectional view of the embodiment of FIG. 2, taken along line 3-3 of FIG. 2.

Referring now to FIG. 3, the first row of ratchet elements 46a is shown in more detail by way of cross-section. As shown, the pivot axle 50 is mounted in the outer race 44 with the locking arm 52 extending toward the inner race 42 in a clockwise direction. In turn, the inner race 42 is provided with a plurality of notches 56 into which the ratchet elements 46 can engage and disengage.

More specifically, each notch 56 includes a cam surface 58 and a shoulder 60. The cam surface 58 is angled such that clockwise rotation of the inner race 42 relative to the outer race 44 causes the locking arm 52 to slide along the cam surface 58 thereby allowing the inner race 42 to freely move. However, when the inner race 42 tries to rotate in the counterclockwise direction relative to the outer race 44, the locking arm 52 engages the shoulder 60 and prevents such rotation. A spring 62 is associated with each ratchet element 46 to bias the locking arms 52 toward the notches 56.

Figure 2:
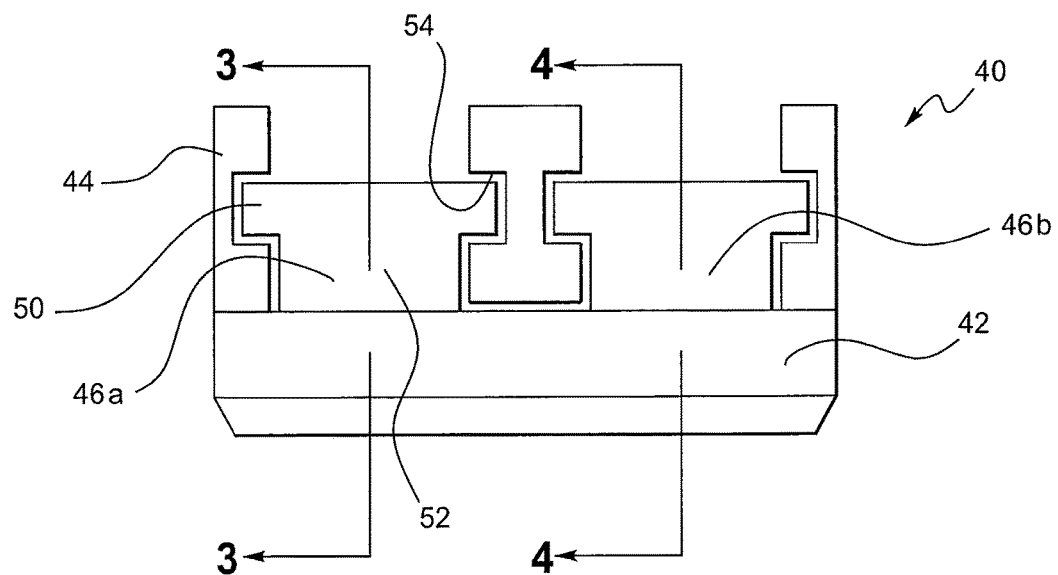
FIG. 2 is a fragmentary view of one embodiment of the clutch assembly.
Figure 4:
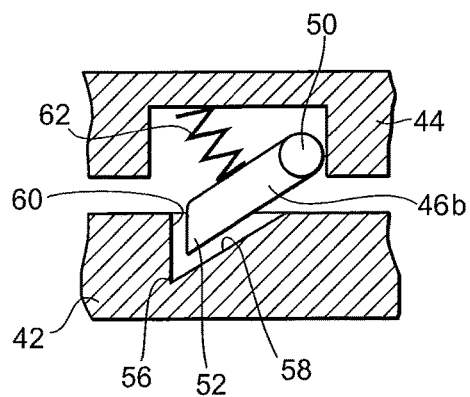
FIG. 4 is a cross-sectional view of the embodiment of FIG. 2, taken along line 4-4 of FIG. 2.

Concurrent with the first row of ratchet elements 46a, however, is the second row of ratchet elements 46b also mounted in the outer race 44. As shown in FIG. 2, the second row 46b may be also circumferentially supported within the outer race 44, but laterally, i.e. axially, spaced from the first ratchet elements 46a. In addition, the second row of ratchet elements 46b may extend circumferentially in the same clockwise direction as the first row 46a, or as shown in FIG. 4, may be mounted so as to extend in the opposite, counterclockwise direction. If mounted in the same direction, the resulting clutch assembly may have a significantly reduced backlash as compared to conventional clutches, e.g., on the order of a fifty percent reduction. Accordingly, the present disclosure is referred to herein as having a reduced backlash factor of, for example, 0.5. If mounted in opposite directions, the resulting clutch assembly could operate in a bi-directional capacity as will be appreciated by those skilled in the art.

Figure 5:
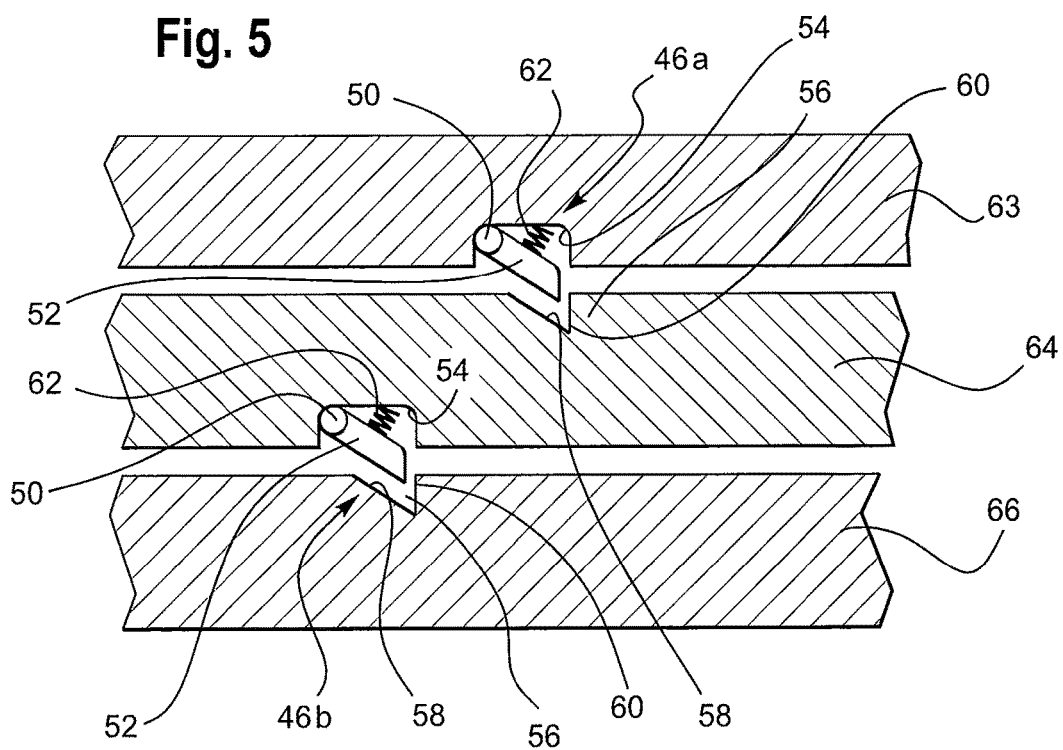
FIG. 5 is a cross-sectional view of another embodiment of the present disclosure employing three races with two radially spaced rows of ratchet elements all extending in the same direction.
Figure 6:
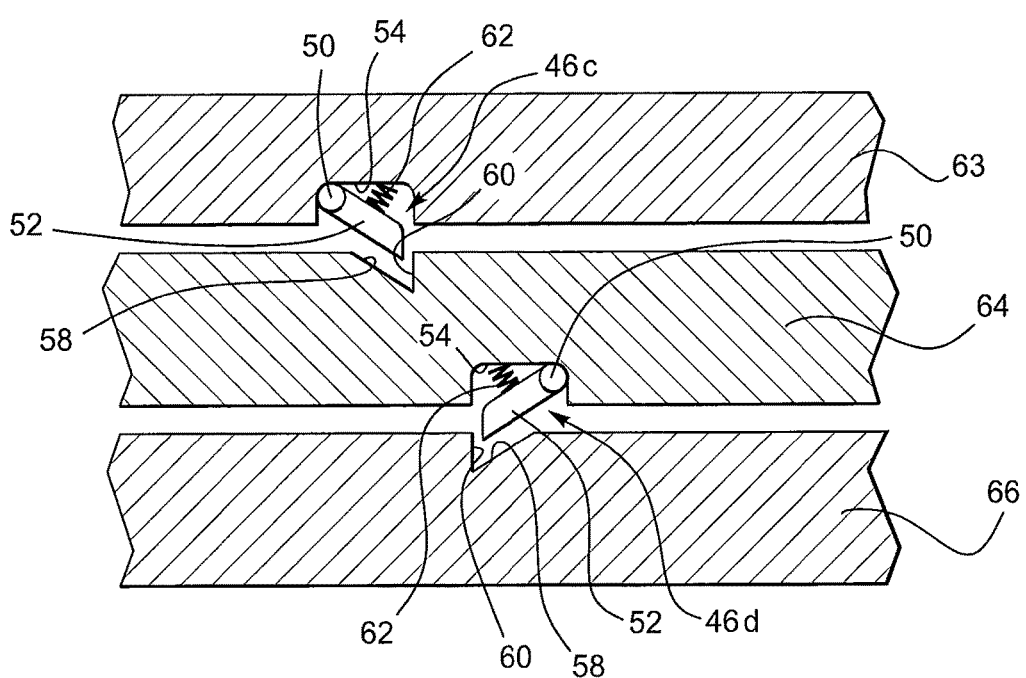
FIG. 6 is a cross-sectional view of another embodiment of the present disclosure, with two radially spaced rows of ratchet elements, the ratchets of each row extending in opposite directions.

In still further alternative embodiments, the first and second rows of ratchet elements 46 may extend between more than two races. For example, and referring now to FIG. 5, such a clutch may include first, second, and third races 63, 64, 66, with a first row of ratchet elements 46a extending between the first race 63 and the second race 64, and a second row of ratchet elements 46b extending between the second race 64 and the third race 66. As such, the first and second rows of ratchet elements 46a and 46b are spaced apart radially, rather than axially (FIG. 2). Referring now to FIG. 6, another embodiment of radially spaced first and second rows of ratchet elements 46c and 46d are mounted to extend in opposite directions rather than in the same direction, as the embodiment of FIG. 5. Thus, the disclosure offers considerable flexibility, and any give choice will depend on most useful or desired geometry/configuration for a particular application. The latter embodiments may provide four distinct modes of operation; specifically: (1) freewheel/overrun of all three races in both clockwise and counterclockwise directions; (2) locked/transmits torque in both clockwise and counterclockwise directions; (3) locked in clockwise direction and overruns in counterclockwise direction; and (4) locked in counterclockwise direction and overruns in clockwise direction, as described below.

An example of use of such radially spaced multiple rows of ratchet elements 46 are as depicted in FIG. 7 and FIGS. 8A through 8D, reflecting an alternate embodiment of the transfer case 10 of FIG. 1. Thus, FIG. 7 depicts a transfer case 10' that utilizes the triple race configuration of FIG. 6; i.e., having mountings of the ratchet elements 46c and 46d extending in opposed directions.

Thus, in comparison with the single or unitary shaft 19 of the transfer case 10 of FIG. 1, the embodiment of FIG. 7 includes two separate but coaxial shafts, rotatable about the axis a'-a'. Thus, an engine input shaft 20' is supported via pocket bearings 25' within a cupped end 27' of an output shaft 24'. In this embodiment, the input shaft 20' incorporates the "driving" race 64 of FIG. 6, while the rear output shaft 24' incorporates the race 66, coupled with the rear wheels (not shown). As noted, the race 64 reflects the input or "driving" race, and as such is configured to drive either the rear wheels via race 66, the front wheels via race 63, or to drive both front and rear wheels via engagement of both races 63 and 66, simultaneously. The ratchet elements 46c, situated between the races 64 and 66, may thus be selectively controlled to drive the rear wheels. On the other hand, the input shaft 20' may also be selectively controlled to drive the front wheels through the race 63 via operation of the row of ratchet elements 46d situated between the races 63 and 64.

Continuing reference to FIG. 7, an actuator cam ring 70 is configured to be selectively rotated through a small angle so as to "clock" about the axis 18' between two limits to either block or to free up the spring-loaded ratchet elements 46c via axially extending fingers 72. For this purpose, the actuator cam ring 70 contains one integral finger 72 for each ratchet element 46c. A separate actuator cam ring 74, also containing one finger 76 for each ratchet element 46d, similarly works in cooperation with, but independently of, the actuator cam ring 70 to either block or free up the spring-loaded ratchet elements 46d, depending on a particular desired driving mode; i.e. whether freewheeling, driving only the rear wheels, driving only the front wheels, or driving both front and rear wheels.

Figure 8A:
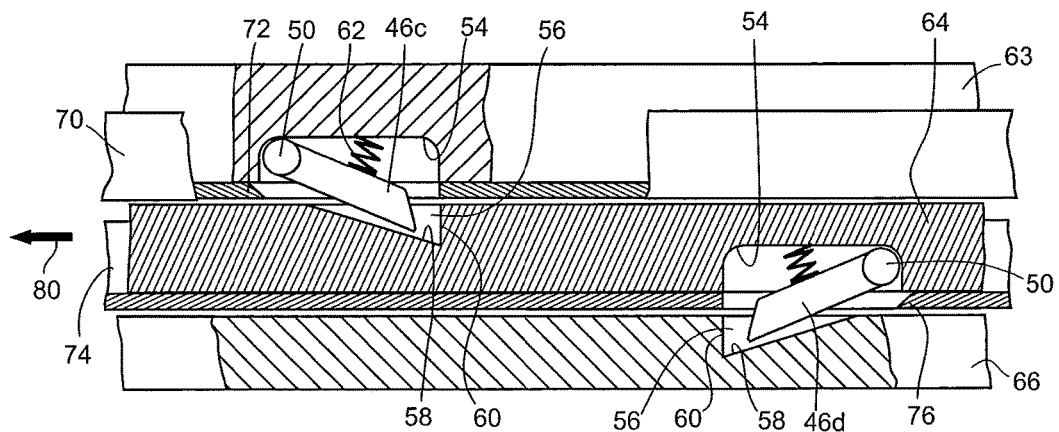
FIGS. 8a through 8d depict various available modes of the transfer case of FIG. 7, as would be viewed along lines 8-8 of FIG. 7; and While the present disclosure is susceptible to various modifications and alternative embodiments, certain illustrative embodiments thereof have been shown in the drawings and will be described below in detail. It is to be understood, however, that there is no disclosure to limit the present disclosure to the specific forms disclosed, but on the contrary, the intention is to cover all modifications, alternative constructions, and equivalents falling within the spirit and scope of the present disclosure.

Referring now to FIGS. 8a through 8d, various operating modes are depicted. FIG. 8a depicts a mode in which both front and rear wheels are driven in a 4-wheel or all-wheel drive mode configuration. In this embodiment, the race 64 is integral to the input shaft 20' (see FIG. 7), and is situated centrally or between the front and rear races 63 and 66. As such, the race 64 is configured to drive races 63 and 64 in a counter clockwise direction represented by arrow 80 (FIG. 8a). Thus, in the all-wheel drive mode of FIG. 8a, the actuator cam rings 70 and 74 have both been clocked to positions wherein each of their respective fingers 72, 76 are out of engagement with each of their respective sets of ratchets 46c, 46d. As such, the springs 62 are free to urge the ratchets into their respective notches 56, so as to cause corresponding driving connections, i.e. in the direction of arrow 80, of each of the rear and front races 66 and 63.

Figure 8B:
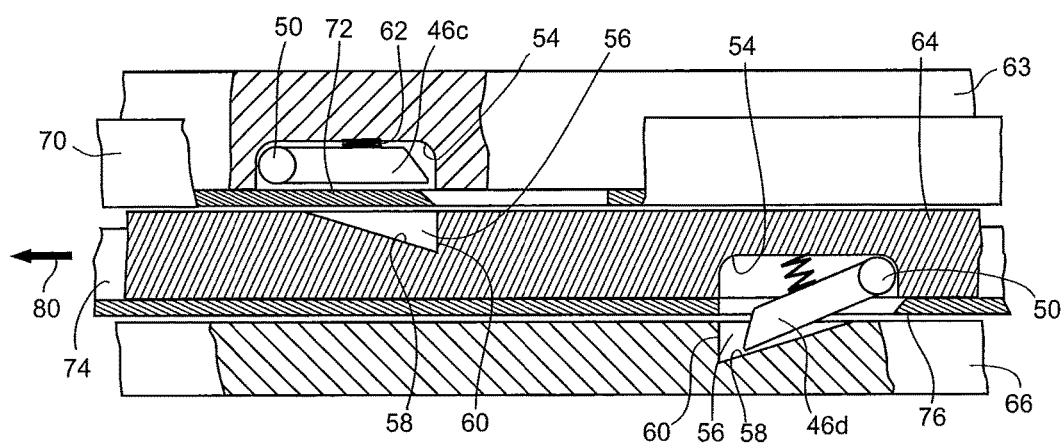

Referring now to FIG. 8b, the actuator cam ring 70 has been rotated clockwise to block the circumferential row or set of ratchets 46c, while the actuator cam ring 74 remains at its position of FIG. 8a, so that the ratchets 46d remain free to engage respective notches 56 in the race 66, as shown. Thus, in this mode only the rear wheels are driven.

Figure 8C:
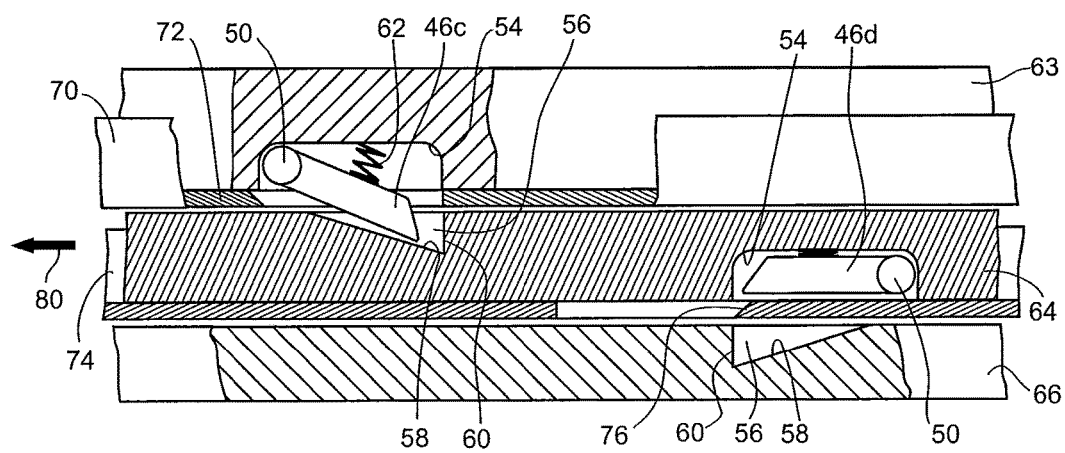

In FIG. 8c, the actuator cam ring 70 has been rotated to its open finger position to free up the row of ratchets 46c, while the actuator cam ring 74 has been rotated to a position in which its fingers 76 block the row of ratchets 46d. In this position only the front wheels can be driven by the input race 64.

Figure 8D:
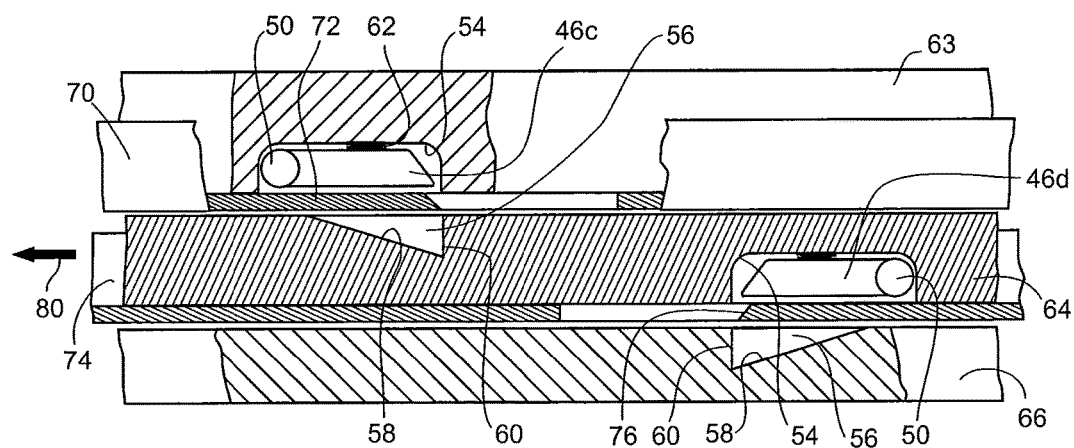

Finally, in FIG. 8d, both actuator cam rings 70 and 74 have been moved to positions in which the respective fingers 72 and 76 of each cam ring are blocking all ratchets 46c and 46d. This configuration represents a coasting or towing mode wherein all races remain free, i.e. fully disconnected from the input for "driving" race 64, regardless of the rotational direction of any particular race with respect to another.

The variously described modes are not dispositive of all capabilities of this disclosure. For example, those skilled in the art will appreciate that the use of a reverse idler gear (not shown) will provide vehicular reversing capabilities for the described driving modes that are otherwise represented by FIGS. 8a through 8c. Thus, with a reverse idler gear, the all-wheel drive mode of FIG. 8a becomes a four-wheel or all-wheel reverse mode. Similarly, FIGS. 8b and 8c may respectively become rear wheel-only and front wheel-only reverse modes.

In the foregoing, it can therefore be seen that the disclosure can be used to construct a clutch with greatly reduced backlash, e.g. up to a fifty percent reduction. In addition, the orientation of the races and plurality of ratchet elements can be used so as to create a selectable clutch having at least having four modes of operation.

What is claimed is:

1. A clutch, comprising:
   a first race;
   a second race coaxially positioned with respect to the first race; and
   a first plurality of ratchet elements extending radially between the first and second races, the first plurality of ratchet elements being mounted in the first race;
   a first actuator cam ring having a plurality of axially extending fingers for each of the first plurality of ratchet elements, each of the plurality of axially extending fingers being configured to shift circumferentially and engage a respective one of the first plurality of ratchet elements to block engagement of the respective ratchet element with the second race;
   wherein the clutch further comprises a third race coaxially positioned with respect to the first and second races, the second race being positioned between the first race and the third race;
   wherein the second race is a drive race configured to selectively drive the first and third races;
   wherein the clutch further includes a second plurality of ratchet elements mounted in the second race, the second plurality of ratchet elements extending between the second and third races;
   a second actuator cam ring having a second plurality of axially extending fingers for each of the second plurality of ratchet elements, each of the second plurality of axially extending fingers being configured to shift circumferentially and engage a respective one of the second plurality of ratchet elements to block engagement of the respective ratchet element with the third race; and
   wherein the first and second actuator cam rings are moveable to select from among at least four distinct operational modes of the clutch.

2. The clutch of claim 1, wherein some of the ratchet elements extend in a clockwise direction, and some of the ratchet elements extend in a counterclockwise direction.

3. The clutch of claim 1, wherein the ratchet elements include a pivot axle from which extends a locking arm.

4. The clutch of claim 1, wherein the first race is machined to have a plurality of mounting recesses into which each ratchet element of the first plurality of ratchet elements is pivotably mounted.

5. The clutch of claim 1, wherein the second race is machined to have a plurality of mounting recesses into which each ratchet element of the second plurality of ratchet elements is pivotably mounted.

6. The clutch of claim 1, wherein each of the second and third races are provided with a plurality of notches into which the respective first and second pluralities of ratchet elements engage and disengage.

7. The clutch of claim 1, wherein each of the second and third races comprise a plurality of notches, each notch including a cam surface and a shoulder, the cam surface being angled such that the locking arm slides freely, and the shoulder engages the locking arm to prevent further rotation.

8. The clutch of claim 1, wherein each ratchet element is associated with a spring, the spring biasing the locking arm toward one of the notches.

9. A method of operating a single clutch with reduced backlash and bi-directional capacity, comprising:
providing a clutch including first, second, and third races, each coaxially positioned with respect to the other races, a first plurality of ratchet elements extending radially between the first and second races, the first plurality of ratchet elements being mounted in the first race, the second race being positioned between the first race and the third race;
forming the second race as a drive race to selectively drive the first and third races;
forming the clutch to have a second plurality of ratchet elements mounted in the second race, with the second plurality of ratchet elements extending between the second race and the third race;
providing first and second actuator cam rings, each actuator cam ring having a plurality of axially extending fingers for each of the respective first and second pluralities of ratchet elements;
rotating the respective actuator cams in a first direction to cause each of the respective associated pluralities of axially extending fingers to shift circumferentially and engage a respective one of the first and second pluralities of ratchet elements to block engagement of the respective ratchet elements with the first and second races; and
rotating the respective actuator cams in a second direction to cause each of the respective associated pluralities of axially extending fingers to shift circumferentially and disengage a respective one of the first and second pluralities of ratchet elements to allow the respective ratchet elements to engage with the first and second races.

10. The method of claim 9, further comprising multiple rows of ratchet elements mounted in the same direction or opposite directions.

11. The method of claim 9, wherein the rotating steps allow for bi-directional use.

12. A motor vehicle transfer case, comprising:
a housing formed by a case and a cover, the case being operatively coupled to an output of a transmission;
an input shaft rotatably supported by an input roller bearing and the case;
a primary output shaft rotatably supported by a rear output roller bearing in the cover;
a secondary output shaft rotatably supported at the lower portion of the housing by a front output roller bearing, the secondary output shaft having a bell-shaped flange operatively coupled to a bulge joint to transmit torque;
a drive sprocket splined to the primary output shaft and operatively coupled to a lower driven sprocket, the lower driven sprocket being rotatably supported by a rear roller bearing to selectively transmit torque to the secondary output shaft; and
a selectable clutch axially situated between the input shaft and the primary output shaft, the clutch unit comprising a first race coupled to the primary output shaft, a second race coupled to the input shaft and coaxially positioned with respect to the first race, and a first plurality of ratchet elements extending radially between the first and second races, the first plurality of ratchet elements being mounted in the first race;
wherein the clutch unit further comprises a third race coupled to the secondary output shaft and coaxially positioned with respect to the first and second races, the second race being positioned between the first race and the third race, the second race being a drive race configured to selectively drive the first and third races; and
wherein the clutch unit further includes a second plurality of ratchet elements mounted in the second race, the second plurality of ratchet elements extending between the second race and the third race, the first and second plurality of ratchet elements being disposed circumferentially in multiple rows between the first, second, and third races, and wherein each of the ratchet elements includes a pivot axle from which extends a locking arm, each of the first and second races being provided with a plurality of notches into which the respective first and second pluralities of ratchet elements engage and disengage.

13. The motor vehicle transfer case of claim 12, wherein some of the ratchet elements of the clutch unit extend in a clockwise direction and some of the ratchet elements extend in a counterclockwise direction.

14. The motor vehicle transfer case of claim 12, wherein the clutch allows for bi-directional use.

15. The motor vehicle transfer case of claim 12, wherein all of the ratchet elements of the clutch unit extend in the same rotational direction.

16. The motor vehicle transfer case of claim 12, wherein the first and second circumferential rows of ratchet elements are radially disposed with respect to the other.

17. The motor vehicle transfer case of claim 12, wherein the first race is machined to have a plurality of mounting recesses into which each ratchet element of the first plurality of ratchet elements is pivotably mounted.

18. The motor vehicle transfer case of claim 12, wherein the second race is machined to have a plurality of mounting recesses into which each ratchet element of the second plurality of ratchet elements is pivotably mounted.

19. The motor vehicle transfer case of claim 12, wherein each of the plurality of notches include a cam surface and a shoulder, the cam surface being angled such that the locking arm slides freely, and the shoulder engages the locking arm to prevent rotation.

* * * * *